United States Patent
Sääskilahti et al.

(10) Patent No.: US 9,184,985 B2
(45) Date of Patent: Nov. 10, 2015

(54) INVESTIGATING A COMMUNICATION ASPECT OF A DATA FLOW

(75) Inventors: Juha Sääskilahti, Espoo (FI); Antti Alinen, Kirkkonummi (FI); Tuomas Lemminkäinen, Jaala (FI); Michael Peltonen, Espoo (FI); Michael Skogberg, Helsinki (FI); Petteri Tammiaho, Kirkkonummi (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 105 days.

(21) Appl. No.: 13/376,518

(22) PCT Filed: Jun. 8, 2009

(86) PCT No.: PCT/SE2009/050684
§ 371 (c)(1),
(2), (4) Date: Dec. 6, 2011

(87) PCT Pub. No.: WO2010/143999
PCT Pub. Date: Dec. 16, 2010

(65) Prior Publication Data
US 2012/0124207 A1   May 17, 2012

(51) Int. Cl.
*H05B 37/02* (2006.01)
*H04L 12/24* (2006.01)

(52) U.S. Cl.
CPC .................. *H04L 41/0631* (2013.01)

(58) Field of Classification Search
CPC ..... H04M 15/00; H04L 41/0893; H04W 4/24
USPC .................................. 709/223, 224
See application file for complete search history.

(56) References Cited

U.S. PATENT DOCUMENTS 6,385,444 B1   5/2002   Peschel et al.
6,418,467 B1   7/2002   Schweitzer et al.
(Continued)

FOREIGN PATENT DOCUMENTS

WO   9737487 A1   10/1997
WO   03079647 A2   9/2003
(Continued)

OTHER PUBLICATIONS

Extended European Search Report dated Sep. 23, 2014, issued in European Patent Application No. 09845902.7, 14 pages.

*Primary Examiner* — Douglas W Owens
*Assistant Examiner* — Monica C King
(74) *Attorney, Agent, or Firm* — Rothwell, Figg, Ernst & Manbeck, P.C.

(57) ABSTRACT

The invention relates to a method, device (24) in a network node of a communication network (N), a computer program and a computer program product for investigating the correctness of a communication aspect of a data flow (DF1) passing through the network, where the data flow is provided in relation to a user terminal (10) connected to the network. The device (24) obtains at least one network generated event data record (EDR1; EDR3) of a first type and a network generated event data record (EDR2; EDR4) of a second type, compares the event data records of the first type with the event data record of the second type, determines the correctness of the communication aspect based on the comparison and sends alarm messages (AM1, AM2) in relation to the communication aspect if the two types of event data records indicate differences in the communication aspect.

20 Claims, 4 Drawing Sheets

26

| EDR | UID | DFID | RC | DFT | EDRT |
|---|---|---|---|---|---|
| EDR1 | UT1 | DF1 | T | FT1 | CR |
| EDR2 | UT1 | DF1 | C | FT1 | AL |
| EDR3 | UT1 | DF2 | C | FT2 | CR |
| EDR4 | UT1 | DF2 | C | FT3 | AL |

(56) References Cited

U.S. PATENT DOCUMENTS

| | | | |
|---|---|---|---|
| 7,142,651 B2 * | 11/2006 | Ronen et al. | 379/114.14 |
| 7,164,758 B1 | 1/2007 | Schneider et al. | |
| 7,463,878 B2 * | 12/2008 | Kumar et al. | 455/406 |
| 7,787,861 B2 * | 8/2010 | Salo | 455/408 |
| 8,005,457 B2 * | 8/2011 | Jones | 455/406 |
| 8,321,526 B2 * | 11/2012 | Raleigh | 709/217 |
| 2005/0138163 A1 * | 6/2005 | Schweitzer et al. | 709/223 |
| 2011/0314145 A1 * | 12/2011 | Raleigh et al. | 709/224 |
| 2012/0124207 A1 * | 5/2012 | Saaskilahti et al. | 709/224 |

FOREIGN PATENT DOCUMENTS

| | | |
|---|---|---|
| WO | 2005017648 A2 | 2/2005 |
| WO | 2005066858 A1 | 7/2005 |
| WO | 2007027964 A2 | 3/2007 |

\* cited by examiner

| EDR | UID | DFID | RC | DFT | EDRT |
|---|---|---|---|---|---|
| EDR1 | UT1 | DF1 | T | FT1 | CR |
| EDR2 | UT1 | DF1 | C | FT1 | AL |
| EDR3 | UT1 | DF2 | C | FT2 | CR |
| EDR4 | UT1 | DF2 | C | FT3 | AL |

INVESTIGATING A COMMUNICATION ASPECT OF A DATA FLOW

CROSS REFERENCE TO RELATED APPLICATION

This application is a 35 U.S.C. §371 National Phase Entry Application from PCT/SE2009/050684, filed Jun. 8, 2009, and designating the United States.

TECHNICAL FIELD

The invention generally relates to communication networks. More particularly, the invention relates to a method, a device in a network node of a communication network, a computer program and a computer program product for investigating the correctness of a communication aspect of a data flow passing through a communication network.

BACKGROUND

In communication networks today user terminals are capable of communicating using many various types of data flows. Users may for instance send and receive data flows in the form of electronic messages, such as MMS, SMS, e-mail and Instant Messaging messages. They may also communicate using data flows that are communication sessions, such as video or voice communication sessions.

When such communication data is passed through a communication network it leaves footprints. There are for instance network access log data records such as routing logs that log how and in what way communication data or data flows are routed through the communication network.

There are also charge log data records that are mainly used for determining how much a user is to be charged for a data flow being passed through the network in relation to his or her user terminal.

In relation to this there may be discrepancies. Charge log data records may relate to communication aspects that are wrong, like indicate the wrong types of data flows or have other errors that are not readily identifiable. Also access logs may be erroneous.

Such faults have to be corrected in order for the network to function properly and ensure that it is dimensioned for the right amounts of traffic, but also in order to charge a user correctly for his or her use of the communication network.

The present invention is therefore directed towards improving on this situation.

SUMMARY

There may be discrepancies in network generated event data records provided in relation to a data flow. They may for instance relate to communication aspects that are wrong, like indicate the wrong types of data flows or have other errors that are not readily identifiable.

Such faults have to be corrected in order for a communication network to function properly and ensure that it is dimensioned for the right amounts of traffic, but also for other purposes like in order to charge a user correctly for his or her use of the communication network.

Such data records are however normally only handled separately, i.e. one type is handled by itself. One type may therefore be used for one purpose, such as to assess how routing takes place, while another may be used for other purposes, like for instance charging.

However, when such event data records are used separately it is hard to determine network discrepancies if they include seemingly correct data.

The invention is therefore directed towards detecting discrepancies in a communication network in relation to a communication aspect of a data flow.

One object of the invention is thus to detect discrepancies in a communication network in relation to a communication aspect of a data flow.

This object is according to a first aspect of the invention achieved through a method for investigating the correctness of a communication aspect of a data flow passing through a communication network, which data flow is provided in relation to a first user terminal that is connected to the communication network. The method is performed in a network node of the communication network. According to the method at least one network generated event data record of a first type that is related to the completion of transfer of the data flow through the communication network is obtained. Also a network generated event data record of a second type related to the routing of the data flow through the communication network is obtained. The event data records of the first type are then compared with the event data record of the second type and the correctness of the communication aspect is determined based on the comparison. If data in the two types of event data records indicate differences in the communication aspect then at least one alarm message is sent in relation to the communication aspect.

The object is according to a second aspect of the invention achieved through a device in a network node of a communication network for investigating the correctness of a communication aspect of a data flow passing through the communication network, where the data flow is provided in relation to a first user terminal that is connected to the communication network. The device comprises at least one communication interface for communicating with other entities in the communication network, an event data record obtaining unit and a communication aspect investigating unit. The event data record obtaining unit obtains at least one network generated event data record of a first type related to the completion of transfer of the data flow through the communication network and a network generated event data record of a second type related to the routing of the data flow through the communication network. The communication aspect investigating unit compares the event data records of the first type with the event data record of the second type, determines the correctness of the communication aspect based on the comparison and sends at least one alarm message in relation to the communication aspect if data in the two types of event data records indicate differences in the communication aspect.

The above-mentioned object is according to a third aspect of the invention achieved through a computer program for investigating the correctness of a communication aspect of a data flow passing through a communication network, where the data flow is provided in relation to a first user terminal that is connected to the communication network. The computer program comprises computer program code, which when running on a device for performing such investigation, causes the device to obtain at least one network generated event data record of a first type related to the completion of transfer of the data flow through the communication network and a second network generated event data record of a second type related to the routing of the data flow through the communication network. The computer program code further causes the device to compare the event data records of the first type with the event data record of the second type, determine the correctness of the communication aspect based on the comparison and send at least one alarm message in relation to the communication aspect if data in the two types of event data records indicate differences in the communication aspect.

The above-mentioned object is according to a fourth aspect of the invention also achieved through a computer program product comprising a computer program according to the third aspect and a computer readable means on which the computer program is stored.

The invention has many advantages. It detects discrepancies between event data records of a first and a second type concerning a communication aspect. This can furthermore be done without the event data records having data that is obviously incorrect. This allows the network to be corrected in relation to these discrepancies. This also allows a better determination to be made regarding allocation of network resources to different users as well as network planning in relation to the investigated communication aspect. This also allows charging to be corrected for the communication aspect. The invention therefore allows a more precise charging to be made in relation to the network resources used.

According to one variation of the invention the second type of event data record is a network access log data record type and the first type of event data record is a charge log data record type.

According to another variation of the invention the communication aspect concerns the data flow type, the event data record of the first type indicates one type of data flow, the event data record of the second type indicates another type of data flow and the alarm message indicates the discrepancy in type.

According to another variation of the invention, the communication aspect concerns the reception of the data flow and the event data record of the second type includes a user terminal data flow reception acknowledgement indicator.

In this variation the method step of obtaining at least one event data record of the first type comprises obtaining a first event data record of the first type including data tentatively indicating that the first user terminal has received the data flow, the method step of comparing involves investigating the existence of a further event data record of the first type that confirms the reception of the data flow and the method step of determining the correctness involves determining that the data flow has been received in case the further event data record of the first type exists and determining that there is a system discrepancy in case it does not.

According to this variation, in the device, the event data record obtaining unit obtains a first event data record of the first type including data tentatively indicating that the first user terminal has received the data flow when it obtains at least one network generated event data record of the first type. The communication aspect investigating unit also investigates the existence of a further event data record of the first type that confirms the reception of the data flow when the communications aspect investigating unit compares event data records and when it determines the correctness of the communication aspect it determines that the data flow has been received in case the further event data record of the first type exists and that there is a system discrepancy in case it does not.

According to this variation the computer program code, when running on the device, causes the device to obtain a first event data record of the first type including data tentatively indicating that the first user terminal has received the data flow when obtaining at least one network generated event data record of the first type. The code also causes the device to investigate the existence of a further event data record of the first type that confirms the reception of the data flow when it compares event data records and to, when it determines the correctness of the communication aspect, determine that the data flow has been received in case the further event data record of the first type exists and that there is a system discrepancy in case it does not.

According to a further variation of the invention the data flow is an electronic message related to the user terminal.

According to another variation of the invention the data flow is a communication session data flow between the user terminal and another terminal.

According to yet another variation, the alarm message indicates a system error in relation to the communication aspect.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards assessing the functioning of a communication network in relation to a user terminal involved in exchanging data flows of media data. Such data flows may typically be network traffic data flows that may be unidirectional, which is the case for some messages or bidirectional, like in the case of communication sessions.

User terminals, which may be such diverse things as cellular phones, laptop computers, palm top computers, electronic organizers etc., are nowadays able to communicate with other terminals in many different ways. They may then receive and send data flows such as network traffic data flows via a communication network, where a data flow may be an electronic message according to a messaging application, such as an SMS, an MMS, an e-mail or an Instant Messaging application message. A data flow can also be a communication session, such as a voice or a video communication session.

In relation to such data flows it is important for the network operator to know that these data flows are successfully transmitted over the network and that the right type of sessions are set up or the right type of messages are being sent. This is important for dimensioning of the network and the control of the traffic through the network. If the network is used in other ways than expected, there is a risk for congestion in the network. However, it is also important for charging purposes, so that a a user of the network is charged correctly for the type of traffic provided in relation to him or her or in relation to his or here user terminal.

In view of this there is therefore a need to obtain better network control of a number of communication aspects of a data flow through the communication network in relation to a user terminal and then more particularly to provide this control via a communication network, which the user terminal is using for communication. The invention is thus directed towards providing such better network control.

A communication aspect is an aspect that concerns the transmission of a data flow through the communication network and may be the correct or proper delivery of the data flow to a user terminal. It may also be the use of the correct type of data flow, for instance a correct electronic message type or a correct communication session type in relation to the data flow that has been negotiated with the network in relation to a user terminal.

Figure 1:
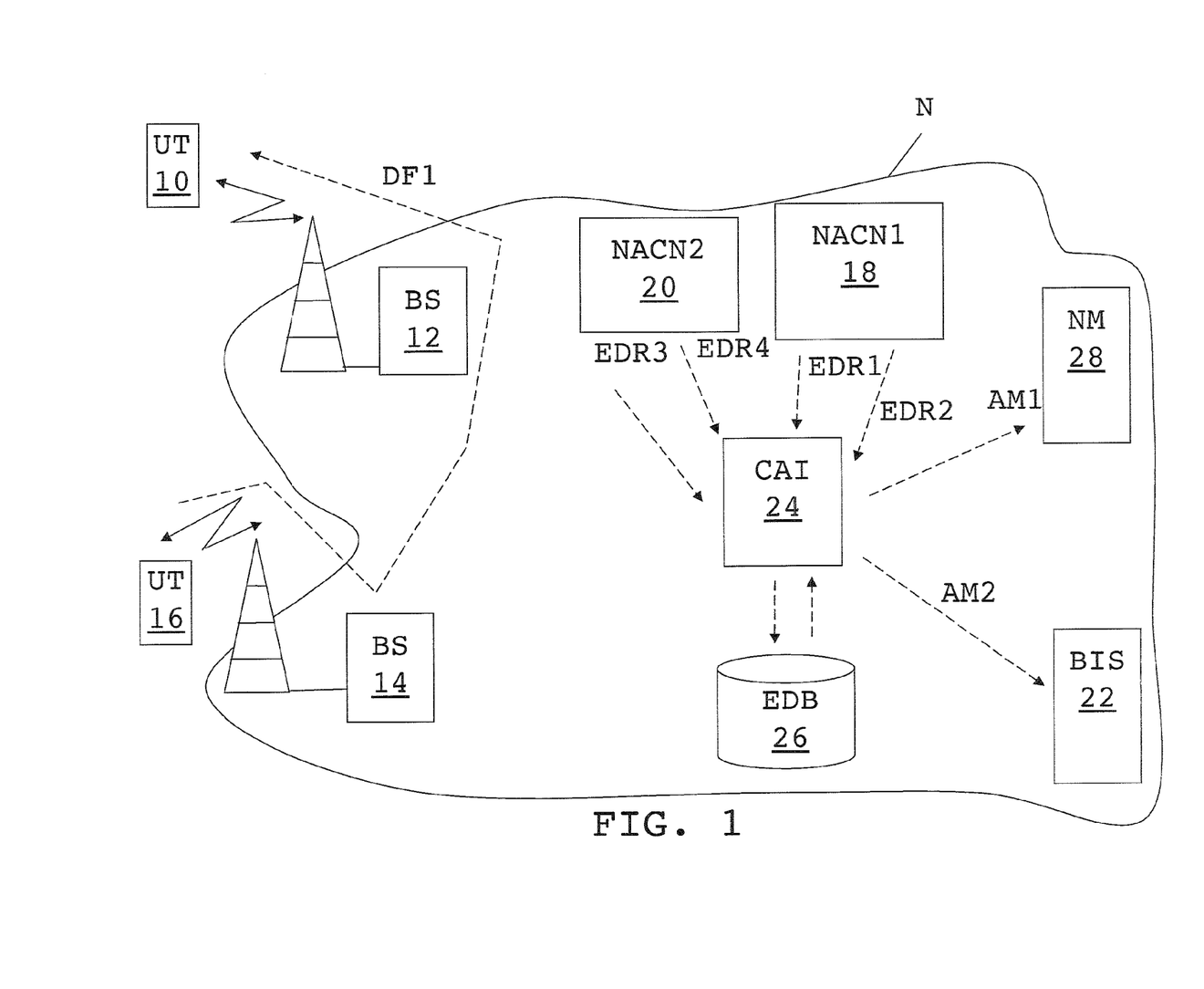
FIG. 1 schematically shows a first user terminal communicating with a second user terminal via a communication network, in which network a device for investigating the correctness of a communication aspect of a data flow according to the invention is provided.

The invention will now be described in more detail in the non-limiting example context of a communication network N that may be a WAN (Wide Area Network). The network N is shown in FIG. 1. This network N may here be a cellular network such as an UMTS (Universal Mobile Telecommunications System) network or an LTE (Long Term Evolution) network. However it may also be a landline network or a computer communication network. To the network N there is connected a first user terminal UT 10, which in the present example is a cellular phone. As was mentioned earlier, a cellular phone is merely one example of a user terminal with which the invention may be used.

In the communication network N there is a first and a second base station 12 and 14, where the first user terminal 10 is in communication with the first 12 of these base stations. A second user terminal 16 is here in communication with the second base station 14. There is furthermore a first data flow DF1 being sent from the second user terminal 16 to the first user terminal, which first data flow DF1 is here an electronic message like a Multimedia Messaging Service (MMS) message.

It should here be realized that the second user terminal 16 may here as an alternative be connected to a further network instead of the communication network N, for instance to a landline network, and be communicating with the first user terminal 10 via the communication network N and this further communication network.

In the communication network N there is also a first network access control node NACN1 18. This node 18 is a messaging control node. This first network access control node 18 may generate event data records of one type relating to the routing of data flows through the communication network. This type may thus be a network access log data record type that provides network access log data records. If the data flows controlled by this node 18 are MMS messages, then the node 18 may include MMS-C node functionality for providing these network access log data records. The node 18 may furthermore generate event data records of another type, which other type relates to the completion of transfer of data flows through the communication network N. The other type may be a charge log data record type providing so-called charge log data records, which charge log data records may be generated through a Policy Enforcement Point (PEP) functionality. Such charge log data records may here be CDRs (Charging Data Records). Both these types of log data records may be obtained via a load balancer.

In the communication network N there is also a second network access control node NACN2 20. This node is a second type of IMS control node that is a communication session control node. This second network access control node 20 may be a Gateway GPRS Support Node (GGSN), which is responsible for handling communication sessions between user terminals connected to the communication network N and other terminals, which other terminals may be connected to the network either directly or via further networks. Also this node 20 may generate event data records of the type relating to routing of data flows through the communication network, i.e. of the network access log data record type. The data flows are in this case communication sessions, such as voice and video sessions, routed through the communication network N. This node 20 may furthermore also generate event data records of the other type that relate to the completion of transfer of data flows through the communication network N. The event data records may thus also here be of the charge log data record type and may be generated through a Policy Enforcement Point (PEP) functionality. The type of event data record that relates to completion of transfer of data flows through the communication network is here a first type of event data record, while the type of event data record that relates to transfer of data flows through the communication network is a second type of event data record.

It should here be realized that these are mere examples of nodes where event data records may be provided. Other examples are Serving GPRS Support Node (SGSN), Call Session Control Function (CSCF) Node, Media Gateway Controller (MGC) node, Multimedia Telephony Application Server (MTAS) node and Session Border Gateway (SBG) node, like N-SBG. Network access log data records may for instance be obtained from any node in the communication network through which a data flow passes.

It should here be realized that the communication network N may also include several more network access control nodes, where some may be provided for other types of data flows, such as SMS messages and Instant Messaging as well as for other types of communication sessions. However, it is equally as well possible that the two network access control nodes 18 and 20 are the only network access control nodes of the communication network N.

The network also includes a network management unit NM 28, which is responsible for network management. In the network there is also a billing system BIS 22, that keeps event data related to the charging. Event data records may also here be charge records in the form of CDRs (Charging Data Records).

In the network N there is furthermore a device 24 for investigating the correctness of a communication aspect of a data flow or a communication aspect investigating device CAI 24. This device 24 is also a node in the communication network and communicates with the first network access control node 18 in order to receive event data records EDR1 of the first type and event data record EDR2 of the second type that are generated by this network node 18. The communication aspect investigating device CAI 24 also communicates with the second network access control node 20 in order to receive event data records EDR3 of the first type and event data record EDR4 of the second type that are generated by this network node 20.

As can be seen in FIG. 1, the communication aspect investigating device 24 obtains a first event data record EDR1 from the first network access control node 18, which first event data record is of the first type, i.e. a CDR that is associated with the first data flow DF1 that is provided in the communication network N in relation to the first user terminal 10. The device 24 also receives a second event data record EDR2 from the first network access control node 18, which second event data record EDR2 is of the second type, i.e. a network access log data record also associated with the first data flow DF1.

The communication aspect investigating device 24 also obtains a third event data record EDR3 of the first type from the second network access control node 20, which third event data record EDR3 is associated with a second data flow of the first user terminal 10. The device 24 further receives a fourth event data record EDR4 of the second type from the second network access control node 20, which fourth event data record EDR4 is also associated with the second data flow.

The obtaining of the event data records may be performed through fetching them. Alternatively the network access control nodes 18 and 20 may push the event data records to the communication aspect investigating device 24, for instance using syslog.

It should be realized that the number of event data records are here limited in order to explain the invention. It should also be realized that normally there are many more being sent through the communication network N. There may also be event data records of other types that an the ones described here.

In the communication network N there is furthermore an event database EDB 26. The communication aspect investigating device 24 may store event data records including the event data records EDR1, EDR2, EDR3, and EDR4 after modification or processing, in the event database EDB 26.

Finally the communication aspect investigating device 24 is shown as sending a first alarm message AM1 to the network management unit NM 28 and a second alarm message AM2 to the billing system 22.

The various nodes in the communication network N, i.e. the network access control nodes 18 and 20, the network management unit 28, the communication aspect investigating device 24, the base stations 12, 14, the billing system 22 and the event database 26 may all communicate with each other and other entities inside and outside of the network using a standardised computer communication protocol, such as TCP/IP. Communication may therefore be connection-less. Communication is therefore indicated in FIG. 1 by dashed arrows, since there are many paths via which communication may take place. However, the first user terminal 10 is in direct connection and here in direct wireless connection with the first base station 12 and therefore this connection is not shown with dashed arrows. The same is here also true for the second user terminal 16. It should however be realized that as an alternative it is possible that also the communication over the wireless interface may be indirect, i.e. that a user terminal communicates with the network via another user terminal.

Figure 2:
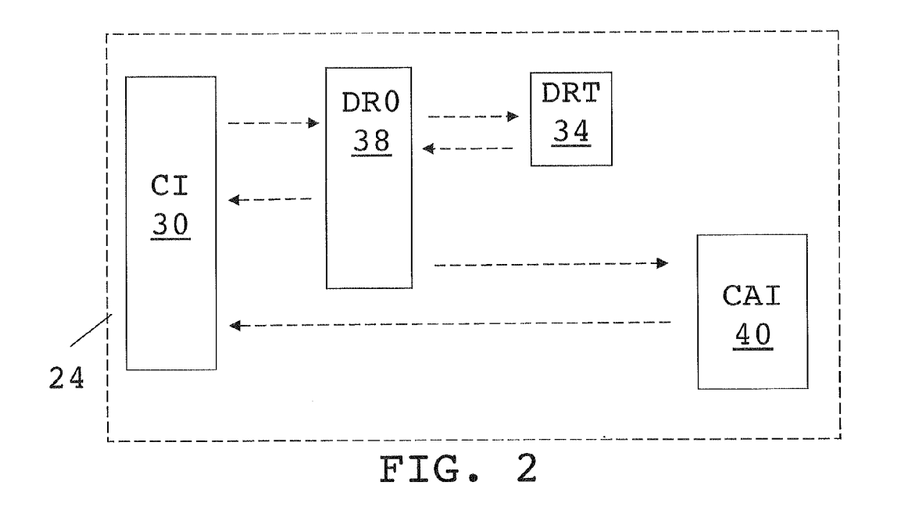
FIG. 2 shows a simplified block schematic of a device for investigating the correctness of a communication aspect of a data flow, FIG. 3 schematically shows the contents of an event database in the network.

FIG. 2 shows a block schematic of the communication aspect investigating device 24. It includes a communication interface CI 30 for communicating with other devices of or in contact with the communication network. In the communication aspect investigating device 24 there is furthermore a data record obtaining unit 38 which obtains, either through fetching or receiving through pushing, event data records from the network and more particularly from the network access control nodes. This data record obtaining unit 38 communicates with a data record transforming unit 34, which transforms the obtained data records to a format suitable for storing in the event database and also suitable for performing communication aspect investigations according to the invention. After having transformed event data records, the data record transforming unit 34 returns the transformed event data records to the event data record obtaining unit 38, which database storing unit 36 stores the transformed event data records in the event database via the communication interface 30. It furthermore forwards these transformed event data records to a communication aspect investigating unit 40. The communication aspect investigating unit 40 may generate alarm messages that are sent, for instance to the network management unit and the billing system, via the communication interface 30. The way the various units of the communication aspect investigating device 24 communicate with each other is schematically shown with dashed arrows in FIG. 2.

Figure 3:
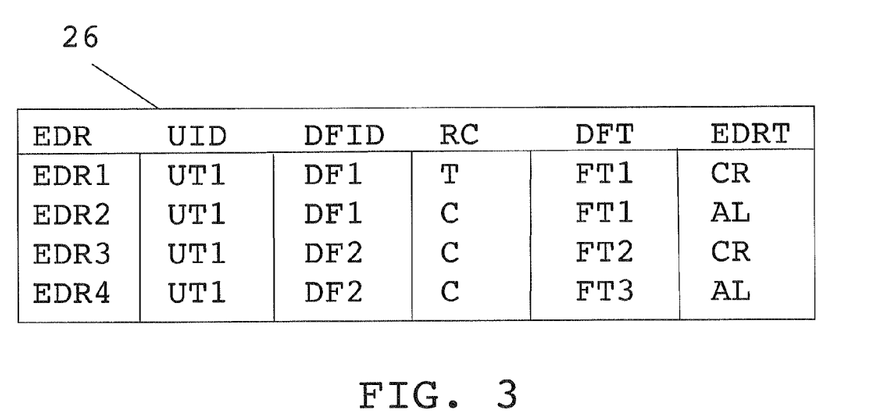

FIG. 3 shows the transformed or modified event data records being stored in the event database EDB 26. The event database 26 here includes a number of rows, where each row is associated with a specific network generated event data record, i.e. with a data record reflecting a network event. The events are here related to the completion of transfer of a data flow through the communication network or a routing of a data flow through the communication network. This means that this database 26 includes events registered by the communication network in relation to all user terminals that are communicating with the communication network N. If the communication network N is large there can be a great number of such event data records registered. The number of event data records shown is here limited to four in order to simplify the description of the invention. In the database the first, second, third and fourth event data records EDR1, EDR2, EDR3 and EDR4 are stored. For each of these event data records there is provided a user terminal identifier UID, which may be an IMSI, IMEI or a cellular phone number associated with the user terminal. A user terminal can also be identified in other ways, for instance via the addresses assigned to it for use in communication in the network. It should here be realized that the user terminal identifiers used may vary. In the case of event data records of the first type, the phone number may be used, while event data sets of the second type may use another identifier, like an IP-address.

There is also data flow identifying data. The data flow identifying data includes a data flow identifier DFID, i.e. an identifier of a particular communication session or of a particular electronic message sent in the communication network. In the event data records there is furthermore a reception complete indicator RC, a data flow type indicator DFT and event data record type indicator EDRT. Each event data record may therefore include a user terminal identifier UID, i.e. an identifier identifying a user terminal associated with a particular data flow, a data flow identifier DFID, which identifies the particular data flow, a reception complete indicator RC, i.e. an indicator indicating that the whole data flow has been received by the user terminal in question or indicating that it has not, or that a data flow has tentatively been received, a data flow type indicator DFT indicating what type of data flow it is, like if it is a message or a session and then possible various subtypes of messages and sessions, like MMS messages and video communication session, and finally an event data record type indicator EDRT indicating if the event data record is of the first second or of any other type of event data record.

As an example, the first event data record EDR1 includes a user terminal identifier UT1 of the first user terminal 10, a data flow indicator DF1 indicating the first data flow in FIG. 1, which is sent from the second to the first user terminal, a reception complete indicator that is set as T, which indicates a tentative reception, a data flow type indicator indicating a first data flow type FT1, which is here an electronic message and more particularly an MMS message and an event data record type indicating the first type of event data record, i.e. the charge log data record type CR. In the same manner the second event data record EDR2 includes a user terminal identifier UT1 of the same first user terminal, a data flow identifier identifying the same first data flow DF1, a data flow reception completed indicator C indicating a complete reception, a data flow type indicator FT1 indicating the first type of data flow and an event data record type indicator AL indicating the second type of event data record, i.e. a network access log data record type. The third event data record EDR3 includes an identifier UT1 of the first user terminal, a data flow indicator DF2, which identifies a second data flow, a reception complete indicator C indicating a complete reception, a data flow type indicator FT2 indicating a second type of data flow, which may be a voice data flow, and an event data record indicator, CR indicating the first type of event data record. The fourth event data record EDR4 includes an identifier UT1 of the first user terminal, a data flow indicator DF2, which identifies the second data flow, a reception complete indicator C indicating a complete reception of the second data flow, a data flow type indicator FT3 indicating a third type of data flow, which may be a video data flow, and an event data record indicator, AL indicating the second type of event data record.

As mentioned earlier the event data records shown here are only exemplifying and the database 26 normally includes many more event data records. It should also be realized that more fields may be included in the database 26 in case more different types of data are to be investigated. Some columns may furthermore be empty for some types of event data records.

The user terminals in the network are involved in communication activities, like sending and receiving electronic messages such as SMS, MMS and Instant Messaging messages or through being involved in communication sessions like video and voice communication sessions. For these activities the network access control nodes that are set to handle access for user terminal to the network generated network access log data records, i.e. to the event data records of the second type. They also generate charge log data records, i.e. event data records of the first type, that are provided to the billing system 22 and used for billing purposes.

Such event data records are here obtained from the corresponding network nodes, as soon as they are generated, by the data record obtaining unit 38 of the communication aspect investigating device 24 via the communication interface 30. The data record obtaining unit 38 thus communicates with the access control nodes 18 and 20 in the network N in order to receive event data records of the first and second types. As an example here it thus communicates with the first network access control node 18 and obtains event data records relating to messaging and in this example relating to MMS messaging handled by this node 18. For this reason it obtains the second event data record EDR2, which is of the second type, and the first event data record EDR1, which is of the first type. It also communicates with the second network access control node 20 in order to obtain event data records generated by this network node, from which it obtains event data records relating to communication sessions. Here it obtains the fourth event data record EDR4, which is of the second type, and the third event data record EDR3, which is of the first type.

The data record obtaining unit 38 thus obtains these event data records EDR1, EDR2, EDR3 and EDR4 from the nodes 18 and 20 via the communication interface 30 and forwards them to the data record transforming unit 34. The data record transforming unit 34 transforms or modifies the received event data records to a format in which they are to be stored in the event database 26 and in which they are to be investigated by the communication aspect investigating unit 40. It thus forms modified event data records that include fields that are to be used for comparisons to be performed by the communication aspect investigating unit 40. In this exemplifying case it thus retains an event data record identifier EDR, a user terminal identifier UID, a data flow identifier DFID, a reception complete identifier RC, a data flow type identifier DFT and an event data record type identifier EDRT. In case some of these fields do not exist, it creates them based on knowledge that it has. If for instance the event data record type is not known from the event data record itself, it can be determined based on which network node sent the event data record in question. It may also leave some fields empty, such as the user terminal identifier field in a network access log record. The user terminal fields may in some variations of the invention be omitted.

The modified event data records are then returned to the event data record obtaining unit 38, which may go on and stores the event data records in the event database 26 via the communication interface 30. After having received the transformed event data records, the data record obtaining unit 38 forwards the vent data records to the communication aspect investigating unit 40.

In this way the event database 26 is filled with network generated event data records EDR1, EDR2, EDR3 and EDR4 concerning several user terminals in the network. The event data records in the event database are here both of the first and the second type, i.e. of a charge log data record type as well as of a network access log data record type. This is here exemplified by four event data records that all relate to the first user terminal 10.

Figure 4:
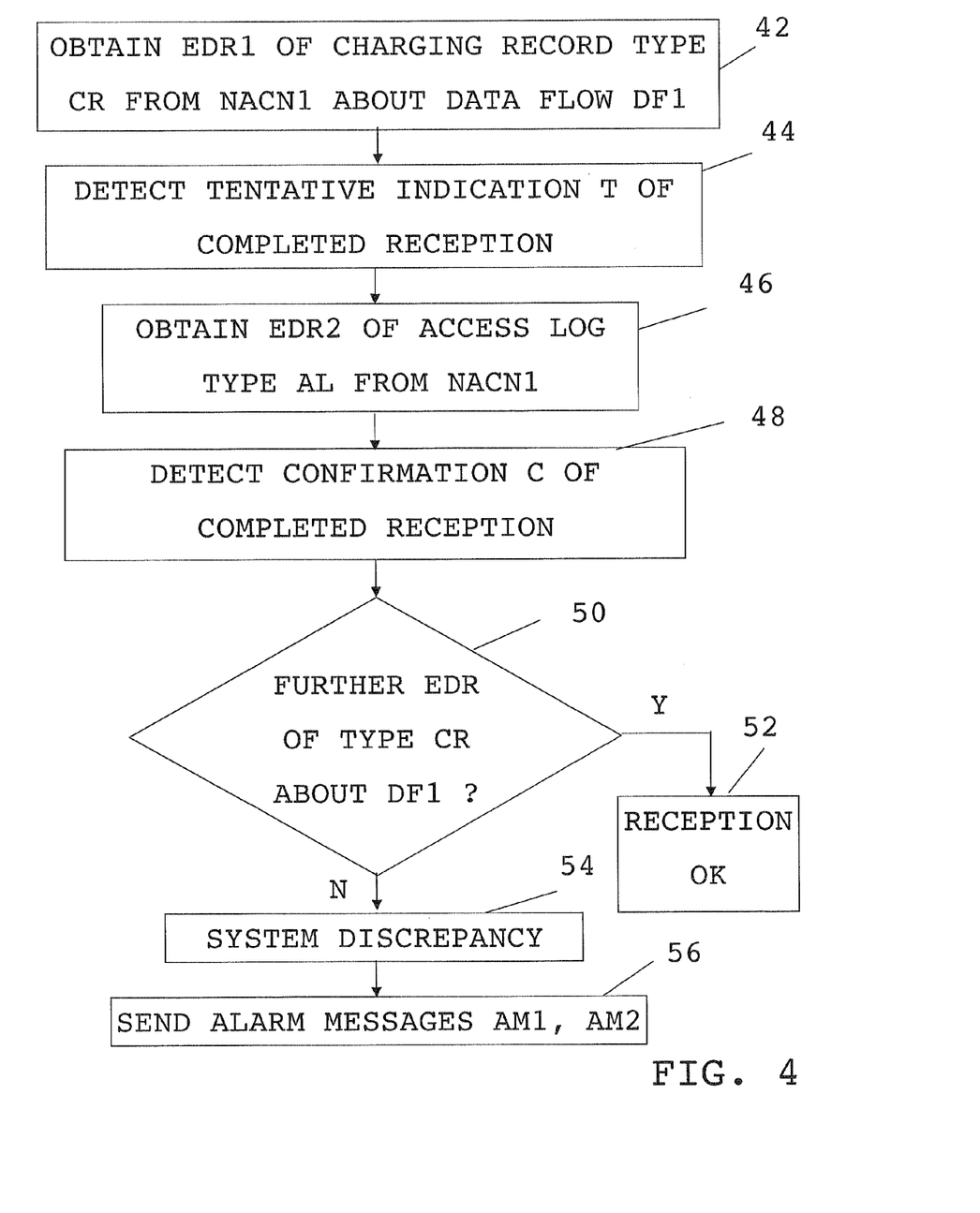
FIG. 4 shows a flow chart of a number of method steps being performed in a method for investigating the correctness of a communication aspect of a data flow according to a first embodiment of the invention.

Now the functioning of a first embodiment of the invention will be described in relation to the previously mentioned FIG. 1-3 as well as with reference being made to FIG. 4, which shows a flow chart of a number of method steps being performed in a method for investigating the correctness of a communication aspect of a data flow according to a first embodiment of the invention.

Event data records concerning for instance the first user terminal 10 are here investigated by the communication aspect investigating device 24 in order to determine if a communication aspect related to the first user terminal is handled correctly in the network or not.

According to the first embodiment of the invention, the communication aspect investigating device 24 investigates the correctness of a first communication aspect of a first data flow DF1 that passes through the communication network N, where the first data flow DF1 is provided in the communication network N in relation to the first user terminal 10. In the present example the first data flow DF1 is of a first data flow type FT1, which is here a messaging data flow, and as an example more particularly an MMS messaging data flow. According to this first embodiment the investigating of the correctness of the first communication aspect is an investigation of if the first user terminal 10 in fact properly receives the MMS message DF1 that is being sent from the second terminal 16.

The data record obtaining unit 38 of the communication aspect investigating device 24 therefore obtains an event data record of a first type related to the completion of transfer of the first data flow DF1 through the communication network N. In this first embodiment this means that the event data record obtaining unit 38 obtains an event data record EDR1 from the first network access control node 18 via the communication interface 30, which event data record EDR1 is of the first type and concerns or is about the reception of the first data flow DF1, step 42. After transforming of the event data record obtaining unit 38 then forwards this first event data record EDR1 to the communication aspect investigating unit 40. The communication aspect investigating unit 40 then investigates the completed reception indicator of this first event data record EDR1. This first record has an indicator T that tentatively indicates that the first user terminal 10 has received the first data flow DF1. The communication aspect investigating unit 40 thus detects a tentative indication T or data tentatively indicating that the user of the first user terminal 10 has received the first data flow, step 44. In the case of MMS this indication may be a so called MM7-store.complete indication. Since this is only a tentative indication of reception of the first data flow DF1, the communication aspect investigating unit 40 may instruct the event data record obtaining unit 38 to fetch an event data record of the second type concerning the same event, i.e. concerning the reception of the first data flow DF1 by the first user terminal 10. It may also wait for such an event data record to be received.

The event data record obtaining unit 38 then obtains an event data record of the second type AL, i.e. a network access log record concerning the same data flow identity DF1. This may be done through fetching it from the first network access control node 18. Alternatively it may wait until one is pushed to the communication aspect investigating device 24 by the first network access control node 18. The event data record obtaining unit 38 therefore obtains this second network generated event data record EDR2 of the second type, which is related to the routing of the first data flow through the communication network, i.e. of the access log type AL, step 46. The event data record obtaining unit 38 then has this second event data record EDR2 transformed and then forwards it to the communication aspect investigating unit 40.

The communication aspect investigating unit 40 then investigates this second event data record EDR2 and more particularly it investigates the reception confirmed indication. It here detects a user terminal data flow reception acknowledgement indicator. The communication aspect investigating unit 40 thus detects an indication that is a confirmation C of a completed reception, step 48. Such a completed reception may in MMS be a so-called Get 200OK message in an MMS-C Access log. This means that the access log data record in the network has confirmed that the first data flow DF1 has actually been received.

The communication aspect investigating unit 40 may then instruct the event data record obtaining unit 38 to look for further event data records of the first type in the first network access control node 18 concerning the first data flow DF1. Alternatively it may instruct it to wait until one is pushed. The communication aspect investigation unit 40 may here also provide the event data record obtaining unit 38 with a time limit specifying how long it should look or wait for this further event data record. The event data record obtaining unit 38 then looks or waits for event data records of the first type CR from the first network access control node 18 concerning the first data flow DF1. In case it does not find or receive any, perhaps because the specified time limit has expired, it informs the communication aspect investigating unit 40. Alternatively the communication aspect investigating unit 40 does itself keep track of the time and may then, in case no event data record is received within the set time limit, which may be for instance five minutes, instruct the event data record obtaining unit 38 to stop looking or waiting.

If the communication aspect investigating unit 40 finds out that there is a further event data record of the first type CR, which includes a reception complete indicator confirming completed reception, then it determines that the first data flow DF1 was received properly, step 52, i.e. that the network functioned properly. However, if no further event data record of the first type CR was received about this first data flow DF1, step 50, the communication aspect investigating unit 40 comes to the conclusion that there is a system discrepancy, step 54. It thus collects or obtains at least one event data record of the first type and compares the obtained event data records of the first type with the event data record of the second type and determines the correctness of the communication aspect based on the comparison. In this first embodiment it furthermore investigates the existence of a further event data record of the first type that confirms the reception of the first data flow and determines that the data flow has been properly received in case the further event data record exists and that there is a system discrepancy in case it does not. An alarm message may then be sent if data in these two types of event data records indicate differences in the communication aspect In case of a system discrepancy the communication aspect investigating unit 40 thus sends a first alarm message AM1 to the network management unit 28 and a second alarm message AM2 to the billing system 22, step 56. This first alarm message AM1 may provide information about a system error in relation to the first communication aspect. The network management unit 28 may then correct the generation of the first type of event data records. The second alarm message AM2 to the billing system 22, may be an instruction to the billing system 22 to bill the user of the first user terminal 10 for the reception of the first data flow DF1.

The investigation performed above may be performed on-line in real-time or close to real-time.

Figure 5:
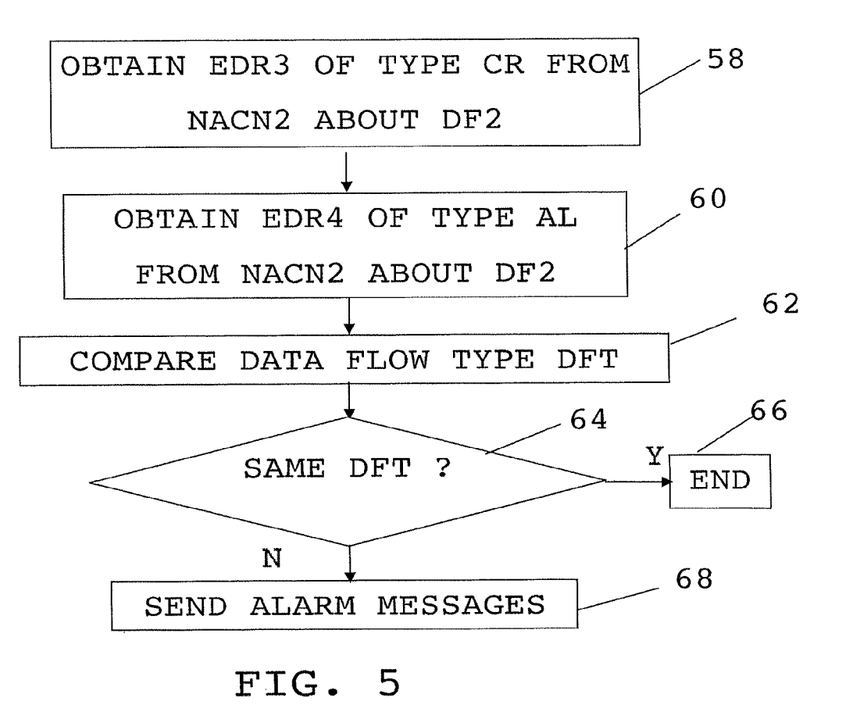
FIG. 5 shows a flow chart of a number of method steps being performed in a method for investigating the correctness of a communication aspect of a data flow according to a second embodiment of the invention, and FIG. 6 schematically shows a computer program product according to an embodiment of the invention in the form of a CD ROM disc on which a computer program of the invention is provided.

Now a second embodiment of the invention will be described in relation to the previously mentioned FIG. 1-3 together with FIG. 5, which shows a flow chart of a number of method steps being performed in a method for investigating the correctness of a communication aspect of a data flow according to a second embodiment of the invention.

In this second embodiment, the investigating of the correctness of a second communication aspect is the investigation concerning the type of data flow that the second data flow DF2 should be. This second data flow DF2 is in this example a communication session between the first user terminal 10 and another user terminal, here the second user terminal 16.

According to this second embodiment of the invention, the communication aspect investigating device 24 investigates the correctness of the second communication aspect of the second data flow DF2 that passes through the communication network and where also the second data flow DF2 is provided in the network N in relation to the first user terminal. According to this second embodiment the investigating of the correctness of the second communication aspect is an investigation of if the type is correct.

The data record obtaining unit 38 therefore connects to the event database 26 via the communication interface 30 and obtains an event data record EDR3 of a first type CR related to the completion of transfer of the second data flow DF2 through the communication network N from the second network access control node 20 via the communication interface 30. As before obtaining may be done through fetching or receiving through pushing. In this first embodiment this means that the event data record obtaining unit 38 obtains the third event data record EDR3 from the second network access control node 20 that is of the first type CR and concerns or is about the completion of the second data flow DF2, step 58. This third record of the first type confirms the reception of the second data flow DF2. After transformation this event data record EDR3 is forwarded to the communication aspect investigating unit 40. Through this third event data record the communication aspect investigating unit 40 knows that the session has been completed, i.e. ended. At the same time the event data record obtaining unit 38 looks or waits for event data records of the second type AL, i.e. it looks or waits for network access log data records concerning the same data flow identity DF2. It then finds or receives the fourth event data record EDR4 form the second network access control node 20. It therefore obtains this further network generated event data record EDR4 of the second type, which is related to the routing of the second data flow DF2 through the communication network N, i.e. of the network access log data record type AL concerning the second data flow DF2, step 60. After transformation the event data record obtaining unit 38 forwards these this fourth event data record EDR4 to the communication aspect investigating unit 40.

The communication aspect investigating unit 40 then compares the third event data record EDR3 of the first type CR with the fourth event data record EDR4 of the second type AL. Here it furthermore compares the indicators regarding data flow type DFT, step 62. It then determines the correctness of the communication aspect based on the comparison. If, according to this second embodiment, they both have the same data flow type DFT, step 64, then the method is ended, step 66. In this case the communication aspect investigating unit 40 comes to the conclusion that the communication network N functions satisfactorily in relation to the second communication aspect.

However, in case they have different data flow type indicators, step 64, then the communication aspect investigating unit comes to the conclusion that there is a system discrepancy, i.e. if the third event data record EDR3 of the first type, the charge log data record type CR, indicates that the data flow was one data flow type, and the event data record of the second type, the network access log data record type AL, indicated another data flow type, then the communication aspect is determined to be incorrect.

In the present example the data flow type indicator DFT of the third event data record EDR3 indicated a second type of data flow DF2, which may be a voice communication session indicator, while the data flow type indicator DFT of the fourth event data record EDR4 indicates a third dataflow type DF3, which may be a video communication session indicator.

The data flow type indicators thus differ between the two event data records. They thus indicate differences in the communication aspect. Therefore the communication aspect investigating unit 40 sends alarm messages, step 68. One alarm message indicating the discrepancy in type may here be sent to the network management unit 28, which may investigate what caused the generation of an incorrect event data record of the first type. This may be important in relation to having the correct dimensions of the network. In case of fraud by the user of the first user terminal, it is here also possible to perform some action like barring the user and the first terminal from the network. The communication aspect investigating unit may here also send an alarm message to the billing system 22, which may then proceed and bill the user of the first user terminal 10 for the third type of data flow FT3 instead of the second type.

Also here investigation is performed on-line in real-time or close to real-time.

As an alternative it is in both embodiments possible that investigation is made at a later stage. It is thus possible that the transformed event data records are stored in the event database, from where they are fetched for investigations.

The communication aspect investigating unit may be implemented as a state-machine. In this respect it should furthermore be realized that there may be provided more than one communication aspect investigating unit, for instance one for each aspect to be investigated.

When storing event data records in the event database, It is furthermore possible to perform correction, such as correction of time stamps, If the time indicated in different event data records are not synchronized with each other, thee may be corrected.

The invention thus has a number of advantages. It detects discrepancies between network access log data records and charge log data records, so that the network can be corrected in relation to these discrepancies. This is not always possible if only one type of event data record is available. An event data record may include data that is appears correct, i.e. reflecting a possible correct communication aspect, but is nevertheless wrong, i.e. does not properly reflect actions and negations performed by a user terminal in the communication network. This also allows a better determination to be made regarding allocation of network resources to different users and network planning. This also allows the charging to be corrected. The invention therefore allows a more precise charging to be made in relation to the network resources used. All this is possible with a limited amount of extra effort and hardware.

Figure 6:
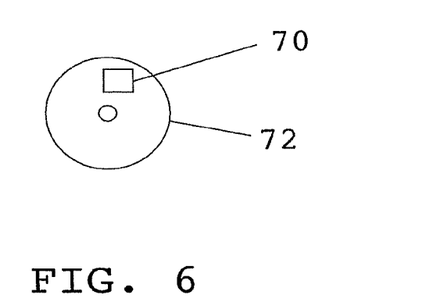

The communication aspect investigating device may with advantage be provided in the form of a processor with associated program memory including computer program code for performing the functionality of the various units that it includes. It should be realized that the device may also be provided in the form of hardware, like for instance in the form of an ASIC circuit. The computer program code may also be provided on a computer readable means, for instance in the form of a data carrier, like a CD ROM disc, a memory stick or a DVD disc, which will implement the function of the above-described units of the communication aspect investigating device when being loaded into a computer. One such computer program product in the form of a CD ROM disc 72 with a computer program 70 including such computer program code is schematically shown in FIG. 6.

The program code can thus also be provided as a pure computer program. This computer program would then include computer program modules, which include computer program instructions that implement the functionality of the units in the communication aspect investigating device. This may be downloaded from a server, for instance via the Internet or via a point-to-point connection.

While the invention has been described in connection with what is presently considered to be most practical and preferred embodiments, it is to be understood that the invention is not to be limited to the disclosed embodiments, but on the contrary, is intended to cover various modifications and equivalent arrangements. There are thus a number of further variations that are possible to make of the present invention. The determination of correct reception of data flows may be performed also in relation to communication sessions. It is likewise possible to also investigate the correct data flow type in relation to messages, like for instance in relation to MMS and SMS messages. It is furthermore also possible to investigate other communication aspects than data flow type and confirming reception. It is for instance possible to investigate security events, such as alerts from firewalls and Intrusion Detecting Systems (IDS) that are being compared with event data records of the above mentioned first or second types. These may also be compared with both. Such security events are also related to the routing of data flows through the communication network. Therefore the invention is only to be limited by the following claims.

The invention claimed is:

1. A method for investigating the correctness of a communication aspect of a data flow passing through a communication network, said data flow being provided in relation to a first user terminal that is connected to said communication network, the method being performed in a network node of the communication network and comprising the steps of:
obtaining at least one network generated event data record of a first type related to a completion of transfer of the data flow through the communication network;
obtaining a network generated event data record of a second type in the form of a network access log data record type that is related to the routing of the data flow through the communication network;
comparing, using a processor, the event data records of said first type related to a completion of transfer of the data flow through the communication network with the event data record of the second type in the form of a network access log data record type, wherein the comparing involves investigating the existence of a further event data record of the first type that confirms the reception of the data flow;
determining, with the processor, the correctness of the communication aspect based on the comparison; and
sending at least one alarm message in relation to the communication aspect in response to determining that data in the two types of event data records indicate differences in the communication aspect.

2. The method according to claim 1, wherein said first type of event data record is a charge log data record type.

3. The method according to claim 1, wherein the communication aspect concerns the data flow type, the event data record of the first type indicates one type of data flow, the event data record of the second type indicates another type of data flow and the alarm message indicates the discrepancy in type.

4. The method according to claim 1, wherein the communication aspect concerns the reception of the data flow, the step of obtaining at least one event data record of the first type includes obtaining a first event data record of the first type including data tentatively indicating that the first user terminal has received the data flow, the event data record of the second type includes a user terminal data flow reception acknowledgement indicator and the step of determining the correctness involves determining that the data flow has been received in case the further event data record of the first type exists and determining that there is a system discrepancy in case it does not.

5. The method according to claim 1, wherein the data flow is an electronic message related to the user terminal.

6. The method according to claim 1, wherein the data flow is a communication session data flow between said user terminal and another terminal.

7. The method according to claim 1, wherein the alarm message indicates a system error in relation to the communication aspect.

8. A device in a network node of a communication network for investigating the correctness of a communication aspect of a data flow passing through the communication network, said data flow being provided in relation to a first user terminal that is connected to said communication network, the device comprising:
at least one communication interface for communicating with other entities in the communication network;
an event data record obtaining unit configured to: (i) obtain at least one network generated event data record of a first type related to a completion of transfer of the data flow through the communication network, and (ii) obtain a network generated event data record of a second type in the form of a network access log data record type that is related to the routing of the data flow through the communication network, wherein both the first and second type of data records are generated from the same node in the network; and
a communication aspect investigating unit configured to: (i) compare the event data records of said first type related to a completion of transfer of the data flow through the communication network with the event data record of the second type in the form of a network access log data record type, wherein the comparing involves investigating the existence of a further event data record of the first type that confirms the reception of the data flow, (ii) determine the correctness of the communication aspect based on the comparison, and (iii) send at least one alarm message in relation to the communication aspect in response to determining that data in the two types of event data records indicate differences in the communication aspect.

9. The device according to claim 8, wherein said first type of event data record is a charge log data record type.

10. The device according to claim 8, wherein the communication aspect concerns the data flow type, the event data record of the first type indicates one type of data flow, the event data record of the second type indicates another type of data flow and the alarm message indicates the discrepancy in type.

11. The device according to claim 8, wherein the communication aspect concerns the reception of the data flow, the event data record obtaining unit when being configured to obtain at least one network generated event data record of the first type is configured to obtain a first event data record of the first type including data tentatively indicating that the first user terminal has received the data flow, the event data record of the second type includes a user terminal data flow reception acknowledgement and the communication aspect investigating unit when being configured to determine the correctness of the communication aspect is further configured to determine that the data flow has been received in case the further event data record of the first type exists and that there is a system discrepancy in case it does not.

12. The device according to claim 8, wherein the alarm message indicates a system error in relation to the communication aspect.

13. A computer program product comprising a computer program for investigating the correctness of a communication aspect of a data flow passing through a communication network, the data flow being provided in relation to a first user terminal that is connected to the communication network, said computer program comprising computer program code which when run on a device for performing such investigation, causes said device to:

obtain at least one network generated event data record of a first type related to a completion of transfer of the data flow through the communication network;

obtain a second network generated event data record of a second type in the form of a network access log data record type that is related to the routing of the data flow through the communication network;

compare, using a processor, the event data records of said first type related to a completion of transfer of the data flow through the communication network with the event data record of the second type in the form of a network access log data record type, wherein the comparing involves investigating the existence of a further event data record of the first type that confirms the reception of the data flow;

determine, with the processor, the correctness of the communication aspect based on the comparison; and send at least one alarm message in relation to the communication aspect in response to determining that data in the two types of event data records indicate differences in the communication aspect.

14. The computer program product according to claim 13, wherein the communication aspect concerns the reception of the data flow, the event data record of the second type includes a user terminal data flow reception acknowledgement indicator and said computer program code when run on a device for performing investigation of the correctness of a communication aspect of the data flow further causes this device to obtain, when obtaining at least one network generated event data record of the first type, a first event data record of the first type including data tentatively indicating that the first user terminal has received the data flow, to determine, when determining the correctness of the communication aspect, that the data flow has been received in case the further event data record of the first type exists and that there is a system discrepancy in case it does not.

15. A non-transitory computer readable medium on which a computer program is stored, wherein the computer program is arranged for investigating the correctness of a communication aspect of a data flow passing through a communication network, the data flow being provided in relation to a first user terminal that is connected to the communication network, said computer program comprising computer program code which when run on a device for performing such investigation, causes said device to:

obtain at least one network generated event data record of a first type related to a completion of transfer of the data flow through the communication network;

obtain a second network generated event data record of a second type in the form of a network access log data record type that is related to the routing of the data flow through the communication network;

compare the event data records of said first type related to a completion of transfer of the data flow through the communication network with the event data record of the second type in the form of a network access log data record type, wherein the comparing involves investigating the existence of a further event data record of the first type that confirms the reception of the data flow;

determine the correctness of the communication aspect based on the comparison; and send at least one alarm message in relation to the communication aspect in response to determining that data in the two types of event data records indicate differences in the communication aspect.

16. The non-transitory computer readable medium according to claim 15, wherein the communication aspect concerns the reception of the data flow, the event data record of the second type includes a user terminal data flow reception acknowledgement indicator and said computer program code when run on a device for performing investigation of the correctness of a communication aspect of the data flow further causes this device to obtain, when obtaining at least one network generated event data record of the first type, a first event data record of the first type including data tentatively indicating that the first user terminal has received the data flow, to determine, when determining the correctness of the communication aspect, that the data flow has been received in case the further event data record of the first type exists and that there is a system discrepancy in case it does not.

17. The method of claim 1, wherein the first type of data record includes a reception complete indicator, RC, that indicates that the data flow, in its entirety, is received by a user terminal.

18. The method of claim 1, wherein the network node generates an event data record for the first type of data record that is sent to a billing system to generate billing data.

19. The method of claim 1, wherein the second type of data record is associated with at least one of voice and video sessions and the second network node is a gateway GPRS support node (GGSN).

20. The method of claim 1, wherein the first type of data record includes a MMS-C node functionality based on when the data flow is a MMS message.

* * * * *